United States Patent [19]

Hawkes

[11] Patent Number: 4,655,673
[45] Date of Patent: Apr. 7, 1987

[54] APPARATUS PROVIDING TACTILE FEEDBACK TO OPERATORS OF REMOTELY CONTROLLED MANIPULATORS

[75] Inventor: Graham S. Hawkes, 12812 Skyline Blvd., Oakland, Calif. 94610

[73] Assignees: Graham S. Hawkes; Sylvia A. Earle, both of Oakland, Calif.

[21] Appl. No.: 493,419

[22] Filed: May 10, 1983

[51] Int. Cl.$^4$ .......................... B25J 3/00; B25J 15/00
[52] U.S. Cl. ..................... 414/730; 901/33; 414/5; 340/407
[58] Field of Search .............. 414/730, 5; 901/33, 901/34, 35, 46; 340/407, 683; 73/587

[56] References Cited

U.S. PATENT DOCUMENTS 3,679,865  7/1972  Jesnitzer et al. ............... 73/587 X
3,948,093  4/1976  Folchi et al. ................... 901/34 X
4,521,685  6/1985  Rebman ......................... 901/33 X

OTHER PUBLICATIONS

Bejcmy, "Effect of Hand Based Sensors on Manipulator Control Performance", Mechanism & Machine Theory, 1977, vol. 12, No. 5, pp. 547-567.

Primary Examiner—Terrance L. Siemens
Attorney, Agent, or Firm—Manfred M. Warren; Robert B. Chickering; Glen R. Grunewald

[57] ABSTRACT

An apparatus and method is disclosed for providing tactile feedback information to the operator of a remotely operated manipulator assembly, such as a robot arm, by mechanically coupling a vibration sensitive transducer to said assembly and audibly reproducing the transducer output for operator listening. The use of an accelerometer as a vibration sensitive transducer is disclosed as well as techniques for cancelling environmental noise.

3 Claims, 3 Drawing Figures

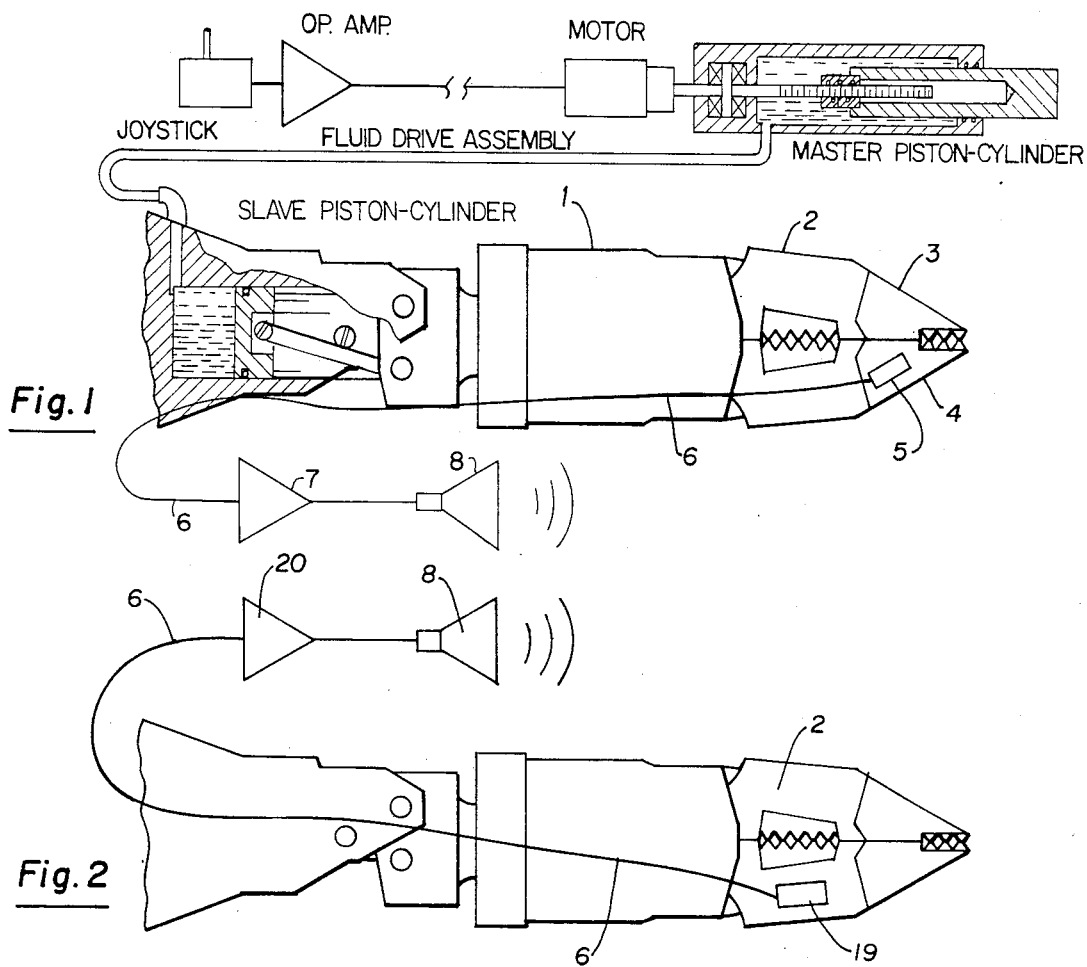
JOYSTICK
OP. AMP.
MOTOR
FLUID DRIVE ASSEMBLY
MASTER PISTON-CYLINDER
SLAVE PISTON-CYLINDER
Fig.1
Fig.2
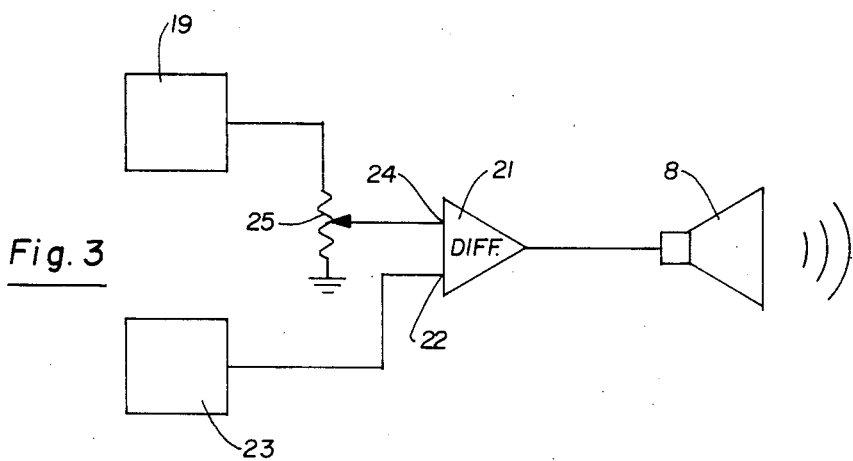
Fig.3

APPARATUS PROVIDING TACTILE FEEDBACK TO OPERATORS OF REMOTELY CONTROLLED MANIPULATORS

BACKGROUND AND FIELD OF THE INVENTION

The present invention relates generally to feedback systems for improving user control of remotely operated devices. In particular, the invention relates to audible feedback systems utilized in connection with remotely operated power driven manipulators such as "robot arms" and the like.

Remotely operated manipulators are finding wide use in fields ranging from surgery to deep sea exploration in environments ranging from undersea to the surfaces of distant planets. In recent years, the use of remotely controlled manipulator systems to explore undeveloped natural resources has increased dramatically. Remotely operated manipulators are usually employed in hostile or humanly inaccessible environments to make repairs or conduct exploration. Typically, such apparatus includes one or more remotely operated, powered arms which have a terminal device, such as claws, pincers or jaws, which are employed as mechanical analogs of the human hand. The manipulator arms are usually jointed and have several axes of movement. The users of remotely operated manipulators have traditionally monitored manipulator position and motion through the use of closed circuit television. This enables the operator to see the effects of his control inputs in real time and make appropriate adjustments.

Video feedback systems, while very useful, do not provide sufficient information concerning manipulator force. Various schemes exist for providing user feedback information and force, speed, displacement and the like. Many of the prior art systems are analogous to the well-known force feedback devices used to give a natural "feel" to pilot controls on large aircraft which use boosted control systems. Other prior art systems utilize various transducers to sense displacement, speed, and force and use the information derived therefrom to operate a duplicate manipulator which is placed proximately to the operator for direct viewing. An additional system for providing user feedback information on force and speed is disclosed in applicant's co-pending application Ser. No. 466,433, filed Feb. 15, 1983 now U.S. Pat. No. 4,604,559 issued Aug. 5, 1986.

The prior art discloses a number of systems for providing the user with information related to the force, speed, and displacement of the remotely controlled manipulator device. While these systems are highly useful, they do not provide the user with a sense of "touch". The great dexterity of the human hand is heavily dependent upon tactile sensitivity more commonly referred to as the sense of touch. The great importance of the sense of touch in performing delicate tasks can be clearly appreciated by observing the great reduction in dexterity which occurs when the sense of touch is dulled by cold weather or a local anesthetic. A person with very cold hands has unimpaired visual feedback, and can, through the sensing of muscle contraction and tendon displacement, obtain some information relating to manual force exerted in the hand. As is well known, however, a normally dexterous person with very cold hands will find his or her manual dexterity severely impaired due to the lack of tactile feedback from the fingertips and the other surfaces of the hand.

The prior art is noticeably lacking in devices which give the user of remotely operated manipulator devices some semblance of a sense of touch. Force, displacement, and speed feedback information is highly useful but it is not equivalent to a sense of touch. Users of such prior art systems receive little or no information relating to the texture of the objects which are being manipulated. By providing the operator with an intuitively interpretable feedback signal from a tactile transducer mechanically coupled to the manipulator arm itself, the heretofore missing sense of touch is created. This feedback greatly improves controllability of the manipulator arm, especially when used to perform intricate tasks or manipulate delicate materials. The addition of a sense of touch to remote manipulator arm assemblies makes the analogy to a human hand much more complete and the operation of the robot arm can begin to closely approximate the motion and dexterity of a human arm and hand.

OBJECTS OF THE INVENTION

Accordingly, it is an object of the present invention to provide a method and apparatus for providing tactile feedback to operators of remotely controlled manipulators.

Another object of the present invention is to provide a tactile feedback system which can be used on a wide variety of robotic devices and is capable of operation in a wide range of operating environments.

A further object of the present invention is to provide a feedback system which allows a user to control a remotely operated manipulator with precision and dexterity heretofore unobtainable.

A still further object of the present invention is to provide an apparatus which provides the operator of a remotely controlled manipulator information in an audible form which can be intuitively related to the texture and hardness of the surface which is in contact with the manipulator arm.

The apparatus and method of the instant invention has other objects and features of advantage which will be set forth in and become apparent from the following description of the preferred embodiment and the accompanying drawings.

SUMMARY OF THE INVENTION

In contrast to the aforementioned feedback systems of the prior art, the present invention provides tactile feedback in the form of audible sound. The instant invention supplements the visual feedback systems of the prior art and other systems which provide force, speed, and displacement information. The essential principles of the invention can be used with all types of remotely operated manipulator systems including hydraulic, pneumatic, and electric types.

In its simplest form, the instant invention employs a microphone, accelerometer, or other vibration sensitive transducer which is mechanically coupled to the manipulator arm assembly. The electrical signal output from the transducer is amplified and, if necessary, processed and then supplied to the user through a speaker or headphone in the form of an acoustic signal. When employed in connection with manipulator arm assemblies of the type disclosed in applicant's co-pending application Ser. No. 466,606, filed Feb. 15, 1983 now U.S. Pat. No. 4,607,998, issued Aug. 26, 1986, the usefulness and dexterity of the overall manipulator system was found to be greatly increased. The apparatus and method of the instant invention are extremely simple to implement and provide easily interpretable information which can, even to a relatively new operator, provide easily interpretable information relating to the texture, hardness, and overall "feel" of the object being touched by the manipulator.

DESCRIPTION OF THE DRAWINGS

FIG. 1 is a block functional diagram of an apparatus employing the present invention.

FIG. 2 is a simplified electrical schematic diagram of an embodiment of the present invention.

FIG. 3 is a schematic block diagram of an alternative embodiment of the present employing additional transducers for noise canceling.

DETAILED DESCRIPTION OF THE INVENTION

FIG. 1 illustrates a remotely operated manipulator arm 1 of a type typically employed in undersea applications. The gripping portion 2 of manipulator arm 1 has jaw portions 3 and 4 which open and close in a manner similar to a crab claw. In a simple embodiment, the instant invention employs a vibration sensitive transducer 5 which is mechanically coupled to the manipulator assembly 1, preferably in close proximity to the gripping portion 2 of the manipulator. The output signal from transducer 5 is carried through cable 6 to amplifier 7 which has its output connected to electro-acoustic speaker means 8 for audibly reproducing the output of said transducer for operator listening. While mounting transducer 5 in close proximity to gripping portion 2 can be expected to provide the best results, it has been found that alternate locations more distant from portion 2 provides surprisingly good results.

There are a great number of different types of transducers which can provide useful information when employed in accordance with the present invention. It has been found, however, that an accelerometer gives highly desirable results and provides a certain amount of freedom from the effects of acoustic noise in the environments surrounding the manipulator arm 1.

Various types of accelerometers can be used in connection with the instant invention including instrumentation accelerometers having one or more axes of sensitivity. When an accelerometer is employed as transducer 5, the user will hear sounds from speaker 8 which can be intuitively interpreted as indicators of texture, hardness, and general "feel" of the object being touched by gripping portion 2 of manipulator arm 1. The different sounds produced by touching steel, as opposed to plastic, are easily distinguishable and interpretable by the user and greatly aid in dexterous operation of the manipulator assembly.

An additional feature afforded by use of the instant invention is that vibrations relating to the operation of the manipulator arm can be heard giving the user additional information on actuator speeds, forces, and other related parameters of performance. It has been found, in actual use, that the focus motor of an attached video camera can be heard clearly as can the various manipulator motor drives thus giving the operator an additional means for monitoring and trouble shooting various manipulator and related or attached equipment operations.

Rigidly mounting an accelerometer to the gripping portion 2 of manipulator arm 1, greatly reduces the influence of noise in the surrounding environment. In undersea applications, environmental noise which would be deafening if sensed by a hydrophone located proximate to (but not mechanically coupled to) the manipulator assembly 1, would not have such a pronounced effect on the output of an accelerometer rigidly affixed to the arm as shown in FIG. 1. The reason for this is that acoustic noise in the surrounding environment would have to be strong enough to accelerate the manipulator assembly 1 in order to produce an output from accelerometer transducer 5. Accordingly, the instant invention can provide useful information relating to the texture and other tactile features of the object which is being manipulated even in a very noisy surrounding environment. This application shows some inherent advantages of employing an accelerometer in place of an ordinary microphone which would be more sensitive to vibrations in the surrounding water unless somehow acoustically shielded.

Referring now to FIG. 2, in the preferred embodiment an instrumentation accelerometer 19 is rigidly mounted on a portion of the manipulator assembly proximate to the gripping mechanism 2 similar to the mounting of transducer 5 illustrated in FIG. 1. Instrumentation accelerometers typically employ a bipolar energizing power supply of plus or minus 9 volts D.C. and provide at their output, a signal which is fed to amplifier 20 through cable 6. Instrumentation accelerometers are typically strain guage type or potentiometer type devices, but include many other types such as piezo electric, moving coil, etc. The output from a velocity transducer can also be differentiated to give dV/dt, thus giving acceleration information. Amplifier 20, employed in connection with the aforementioned instrumentation accelerometer, should be set to exhibit a gain sufficient to provide a useful output to speaker 8. In actual practice, an ordinary high-fidelity amplifier set at 60 dB gain has been used as amplifier 20 and provides good results. While linearity of transducer response is not essential, good results are obtained using devices which exhibit substantially linear response to vibration signals over a bandwidth of e.g. 20 hz-20 khz which is approximately the bandwidth of human hearing. When accelerometer 19 is rigidly mechanically affixed to the structure of manipulator arm 1, undersea noise and pressure variations will affect the accelerometer output only as much as they cause acceleration of the relatively massive manipulator assembly. Again, the superiority of performance of the instant invention as compared to a proximately located non-affixed hydrophone is apparent.

When used in connection with smoothly operating manipulator arms having relatively quiet drive mechanisms, a single vibration transducer or accelerometer has been found to provide highly useful outputs. There may be, however, some applications in which manipulator noise and vibration caused by motors, hydraulic actuators, and the like, cause objectionable interference which can be eliminated, or greatly reduced, by an embodiment of the invention schematically illustrated in FIG. 3. In FIG. 3, amplifier 21 is a differential amplifier having one input 22 connected to a second vibration sensitive transducer 23 which is mounted proximate to the portion of the manipulator assembly which is producing the objectionable noise. The output from transducer 19 is connected to input 24 of differential amp 21. Transducer 19 is mounted, as previously explained, proximate to the gripping portion of the manipulator assembly so as to obtain tactile information closest to the gripping surface. The output from differential amplifier 21 is used to drive loudspeaker 8 which should, if the system is properly installed, reproduce a signal which represents the difference between the noise and the desired vibration signal sensed at the gripping surface which is a combination of noise and desirable signal. The resultant sum should be a relatively noise-free signal. Means 25, schematically illustrated as a potentiometer, can be used to vary the relative level of the transducer output signals for optimizing the noise canceling effects of the differential amplification performed by amplifier 21.

Other well-known noise canceling techniques can be used such as those employed in the commonly available noise canceling microphones used in radio communications.

What is claimed is:

1. In a combination, a manipulator arm assembly and a tactile feedback apparatus comprising:
   (a) a remotely operated manipulator arm having movable portion, a gripping mechanism carried by said movable portion, and a fluid drive assembly coupled to displace said movable portion and said gripping mechanism, said fluid drive assembly being formed for displacement of said movable portion and said gripping mechanism without producing substantial acoustically induced vibration in said arm; and
   (b) a tactile feedback apparatus including:
      (i) an accelerometer formed to provide an electrical output signal and rigidly mechanically coupled to one of said movable portion and said gripping mechanism sufficiently proximate to said gripping mechanism to enable sensing of contact-induced vibrations occurring in said gripping mechanism upon contact of said gripping mechanism with an object and distinguishing of said contact-induced vibrations from background acoustical noise from said fluid drive assembly and from the medium surrounding said manipulator arm; and
      (ii) means coupled to said accelerometer for audibly reproducing said output signal for operator listening.

2. The manipulator arm assembly and tactile feedback apparatus as defined in claim 1 wherein,
   said accelerometer is rigidly coupled directly to said gripping mechanism.

3. The manipulator arm assembly and tactile feedback apparatus as defined in claim 2 wherein,
   said manipulator arm includes a stationary portion and said movably portion is mounted for movement with respect to said stationary portion, and
   said fluid drive assembly includes at least one master piston-cylinder assembly positioned on said stationary portion and at least one slave piston-cylinder assembly coupled for fluid communication with respect to said master piston-cylinder assembly, said slave piston-cylinder assembly being mounted on said movable portion to drive said movable portion and said gripping mechanism.

* * * * *